United States Patent
Wuechner

[11] Patent Number: 5,934,918
[45] Date of Patent: Aug. 10, 1999

[54] LOCKING DEVICE FOR PROTECTING A VEHICLE CHARGE SOCKET

[75] Inventor: Erwin Wuechner, Altbach, Germany

[73] Assignee: Daimler-Benz Aktiengesellschaft, Germany

[21] Appl. No.: 08/948,239

[22] Filed: Oct. 9, 1997

[30] Foreign Application Priority Data

Oct. 16, 1996 [DE] Germany .............................. 196 42 687

[51] Int. Cl.⁶ ...................................................... H01R 13/44
[52] U.S. Cl. ............................ 439/133; 439/144; 439/347
[58] Field of Search .................................... 439/134, 137, 439/304, 305, 345, 347, 359

[56] References Cited

U.S. PATENT DOCUMENTS 5,478,249   12/1995   Crestin ..................................... 439/138
5,478,250   12/1995   Hoffman ................................... 439/142

FOREIGN PATENT DOCUMENTS

| 0 568 030 | 11/1993 | European Pat. Off. . |
| 33 27 087 C1 | of 0000 | Germany . |
| 35 04 466 C1 | of 0000 | Germany . |
| 36 41 124 A1 | of 0000 | Germany . |
| 84 09 997 U1 | of 0000 | Germany . |
| 2 212 551 | 7/1989 | United Kingdom . |

*Primary Examiner*—Neil Abrams
*Assistant Examiner*—T C Patel
*Attorney, Agent, or Firm*—Evenson, McKeown, Edwards, Lenahan, P.L.L.C.

[57] ABSTRACT

A locking device protects a charge socket on a vehicle having a traction battery, for charging the traction battery. A charge plug, which is connected with a current source by way of a charge cable, is insertable into the charge socket. The charge can be locked by the locking device to prevent removal. The locking exercised by the locking device is effected by a swing lid which, in the closed position, is used for covering the charge socket. Alternatively, the locking device exercises a locking effect directly on the inserted charge plug whereby the locking device can simultaneously be used for locking the swing lid in its closed position.

14 Claims, 3 Drawing Sheets

LOCKING DEVICE FOR PROTECTING A VEHICLE CHARGE SOCKET

BACKGROUND AND SUMMARY OF THE INVENTION

This application claims the priority of German application 196 42 687.1, the disclosure of which is expressly incorporated by reference herein.

The present invention relates to a locking device for protecting a charge socket on a vehicle having a traction battery, and more particularly, a locking device having a charge plug, which is connected with a current source by way of a charge cable and being insertable into the charge socket. The charge socket is arranged on an outside wall of the vehicle body and is coverable by a swing lid which, in the closed position, is flush with the surface of the vehicle-body-fixed wall part surrounding it and can be locked in the closed position by the locking device.

Locking devices for protecting a tank filler neck in, for example, motor vehicles operated by liquid fuel are well known and are used in particular to protect the content of the tank against manipulations by unauthorized persons. DE 35 04 466 C1 discloses a locking device in which a covering swing lid (tank lid) can be locked in a closed position for protecting the tank filler neck. The locking device can be operated by a control element by outside power so that it can be coupled to a central vehicle locking system.

In battery-operated electric or hybrid vehicles, an exterior charge socket is required for charging the traction battery. A fitting charge plug can be inserted into the charge socket and connected with a current source via a charge cable. A known charge socket with a corresponding charge plug is shown in U.S. Pat. No. 5,478,249. The charge socket and the charge plug are conceived with respect to a reliable everyday suitability and also have measures for a protection against wetness. As the charge plug, either a comparatively large charge plug for the direct-current quick charge can be introduced by a special charge station or a smaller charge plug for an alternating-current charge at a household socket can be introduced into the charge socket. Similar to the case of a fuel dispensing nozzle, both charge plugs are provided with a molded-on handle. For introducing a charge plug into the charge socket, the charge plug must first be introduced on the contact side into an opening and must then be swivelled about an axis of rotation. Thereby, the contacts of the charge plug will contact corresponding contacts of the charge socket only at the end of the swivel movement. In this end position, the charge plug is locked in the charge socket so that the charge plug can be released by the operator and the charging can start.

Analogously to the filler neck compartment lid, for protecting a charge socket, a swing lid can be provided for the charge socket which, in the closed position, extends flush with the surface with respect to a surrounding vehicle-body-fixed wall part and has a locking device to protect the charge socket in the closed position against manipulations by unauthorized persons by locking the swing lid.

Such a known locking device for protecting a charge socket has a disadvantage that, when the vehicle is parked for charging, the charge plug can be taken out of the charge socket by unauthorized persons and the charging operating can be interrupted which is a particularly serious disadvantage in the case of long charging times. It is also disadvantageous that the charge plug in the charge socket is not sufficiently protected against rain and wetness.

In the field of household electricity, an installed socket with a folding lid constructed as a cap is shown in DE 36 41 124 A1. This folding lid, because of a large cap depth, can also be closed when a plug is inserted into the socket. On a side thereof opposite to hinges, the folding lid is provided with a recess which permits an exiting of the connection cable fastened to the plug from the closed folding lid.

Also in the field of household electricity, an adapter for securing network plugs against unauthorized use is shown in DE 33 27 087 C1 whereby, for example, children can be prevented from using a television set. The adapter has a separate plug and a socket. A plug inserted into the socket can be locked by a locking device with a fitting hasp. The same locking device allows a switch to be operated for controlling the electric connection between the plug and the socket within the adapter. When the plug is not inserted, however, the hasp offers no significant protection against a manipulation of the socket.

DE 84 09 997 U1 describes a circular CEE socket for camping and caravan in which a cover flap can be locked in the closed position by a padlock in order to prevent an unauthorized removal of current from the socket. When the cover flap is open, an inserted plug can be locked by the same padlock in order to be able to prevent an unauthorized current interruption by taking out the plug. For this purpose, one protruding lug respectively is molded onto the socket and correspondingly to the cover flap or to the plug, which lug has an opening into which the cotter pin of the padlock engages. The socket is used, for example, for supplying camping sites with electricity because it can prevent an unauthorized removal of a plug or an exchange of plugs. In addition, the cover flap has a nose which interacts with a cam on an inserted plug and which acts as a protection device against a removal which can be disengaged by a swivelling-open of the cover flap.

It is an object of the invention to improve the protecting of the charge socket of an electric vehicle such that a better protection is offered against manipulations by unauthorized persons.

This object has been achieved in accordance with the present invention by providing that by means of the locking device, the swing lid can be locked in a secured position, the secured position corresponding to a certain open position in which the swing lid can exercise a locking effect with respect to a removal of an inserted charge plug or by means of the locking device, a charge plug, which is inserted into the charge socket, can be locked against a removal in that the locking bar engages in a holding opening on the charge plug.

The locking device according to the present invention secures a charge plug introduced into the charge socket with respect to a removal. This has the advantage that a vehicle can be parked for charging in an unattended manner because the charging operation cannot be interrupted by unauthorized persons. During the charging operation, the charge socket itself is also protected with respect to manipulations by the non-removable charge plug.

In an advantageous further development, the locking effect exercised by the locking device is exercised by a swing lid which, in the closed position, is used for covering the charge socket. In one configuration, an extensive protection against rain and wetness is achieved.

In an alternative embodiment, the locking device exercises a locking effect directly on the inserted charge plug, in which the locking device can also be simultaneously used for locking the swing lid in its closed position.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
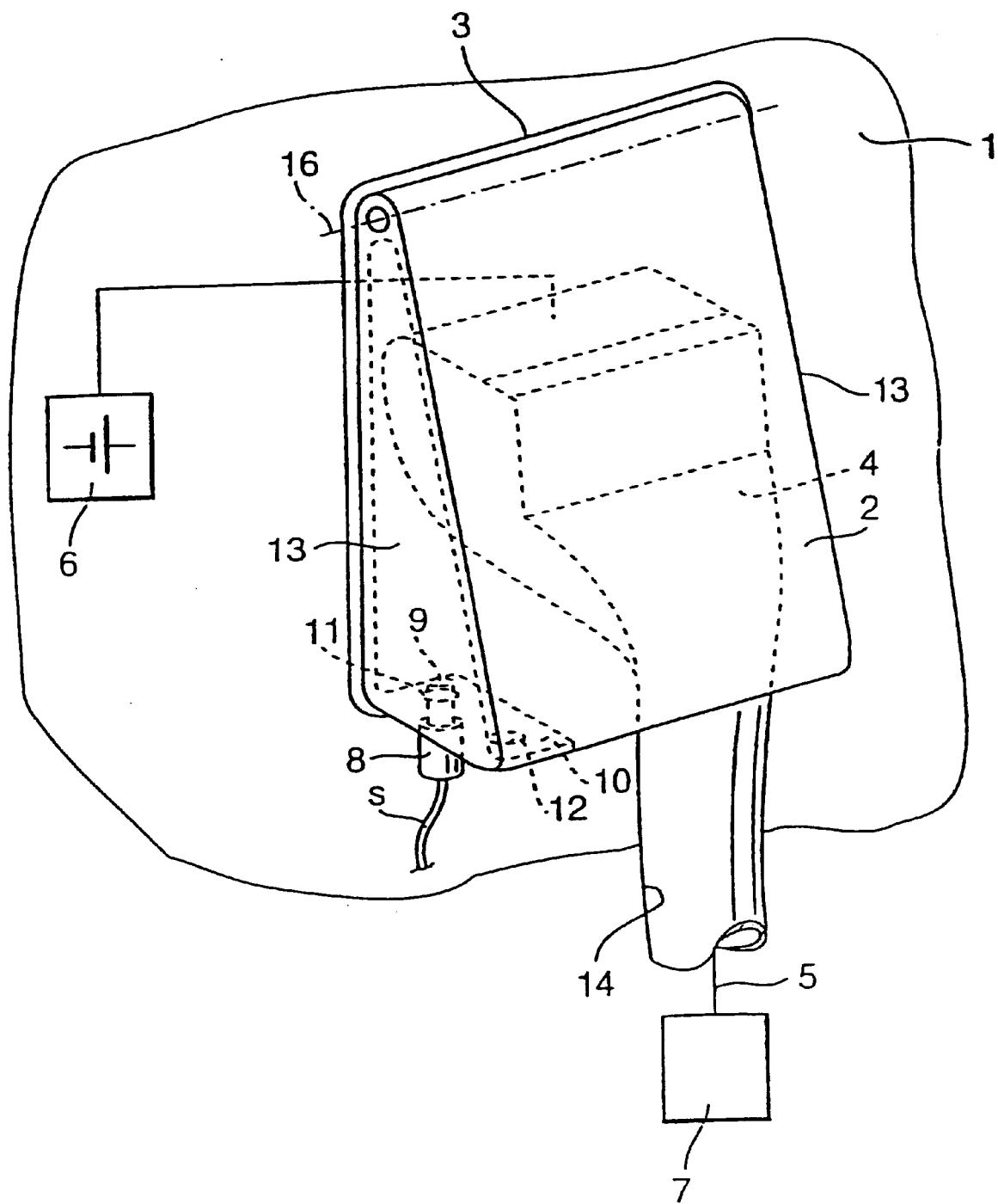
FIG. 1 is a perspective view of a first embodiment of the locking device according to the present invention, in which a charge plug inserted into a charge socket is secured with respect to a removal by a lockable swing lid.

FIG. 1 illustrates a cutout and a perspective outside view of a charge socket 3 of a vehicle driven by a traction battery 6, such as an electrical or hybrid vehicle. The charge socket 3 is arranged on an outside wall 1 of the vehicle body and can be covered by a swing lid 2. For charging the traction battery 6, a charge plug 4 is inserted into the charge socket 3 and is connected by way of a charge cable 5 with a current source 7, such as a charging station or a household socket. When the charge plug 4 is inserted, the swing lid 2 is in an open position. When no charge plug is inserted, the swing lid 2 can be closed to the position shown in dotted line in FIG. 2. In this closed position, the swing lid 2 extends as flush as possible with the surface of the wall part of the outside wall of the surrounding vehicle body.

Figure 2:
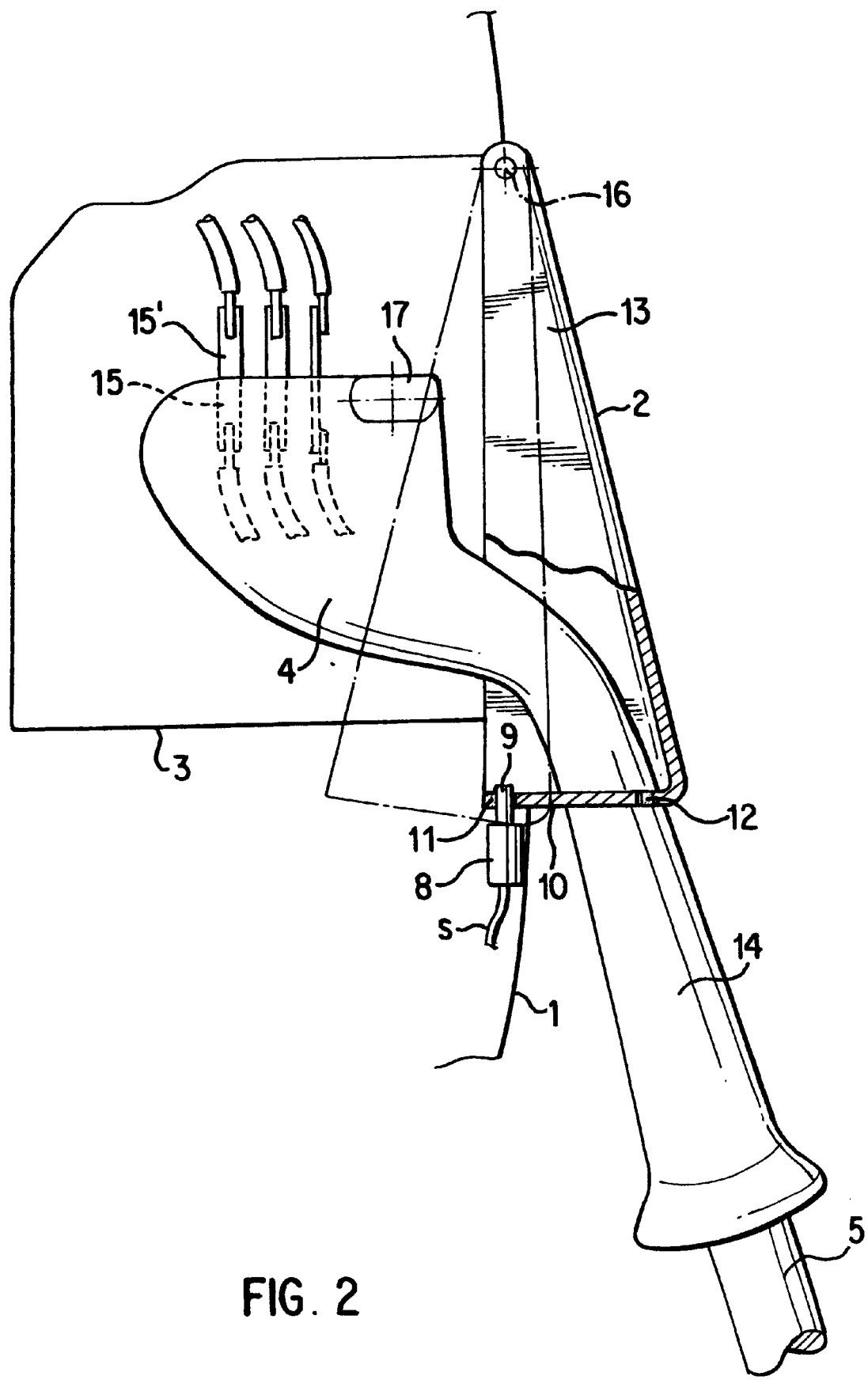
FIG. 2 is a cross-sectional view of the locking device of FIG. 1 with the swing lid shown flush in dotted line with an outer surface of the vehicle body.

In the first embodiment illustrated in FIGS. 1 and 2, the locking device locks the swing lid 2 in a certain open position, in which the swing lid 2 can carry out a locking effect with respect to the removal of the inserted charge plug 4. This securing position corresponds, for example, to the minimal open position of the swing lid 2 when the charge plug 4 is inserted, as illustrated in FIGS. 1 and 2.

The locking device has, for example, an electric, pneumatic or hydraulic control element 8 which, triggered by a switching signal S, carries out a reversible lifting operation of a displaceably disposed locking bar 9 which brings the locking bar 9 into a locking position. The control element 8 is arranged in the direct proximity of the charge socket 3 such that the displacement of the locking par 9 takes place in parallel to the outside wall 1 of the vehicle body. For locking the swing lid 2, the locking bar 9, in the locked position, engages in a holder 10 on the swing lid 2. In the embodiment, the holder 10 is formed by a lug which protrudes on the interior side of the swing lid and has a first holding opening 11 for locking the swing lid 2 in the secured position.

In an advantageous further development, the locking device is additionally used for being able to lock the swing lid 2 also in the closed position. For this purpose, a second holding opening 12 is provided on the holder 10 at a corresponding point, into which holding opening 12 the locking bar 9 can engage when the swing lid is to be locked in the closed position.

For a better protection against spraying and wetness, it can be provided that the swing lid has spray guard surfaces 13 bent perpendicularly to the outer surface so that an inserted charge plug 4 is largely protected against spraying water or rain. When the swing lid 2 moves into the closed position, the spray guard surfaces 13, which also swing in, are received by corresponding recesses in the outer wall 1 of the vehicle body. In addition to offering a protection against spraying, the spraying guard surfaces 13 also offer an improved protection with respect to manipulations of a charge plug 4 inserted into the charge socket 3.

FIG. 2 is a cross-sectional view of the locking device according to FIG. 1. The charge plug 4 has a shape which is known from U.S. Pat. No. 5,478,249. In a manner similar to that of a filler nozzle, a handle 14 is shaped onto the charge plug 4. For introducing a charge plug 4 into the charge socket 3, the charge plug 4 is inserted into the opening of the charge socket 3, which is exposed in the open position of the swing lid 2, and is swivelled about a support point 17. At the end of the swinging movement, the contacts 15 of the charge plug 4 will contact the corresponding contacts 15' of the charge socket 3. In this end position, the charge plug 4 is locked in the charge socket 3 so that the handle 14 of the charge plug 4 can be released by the operator and the charging operation can start. As also illustrated in FIG. 2, during the charging, the charge plug 3 is protected from a removal by the swing lid 2 locked in the securing position in that the locking bar 9 engages in the first holding opening 11 of the holder 10.

The embodiment illustrated in FIGS. 1 and 2 relates to a swing lid 2 which can be swung about a horizontal axis of rotation 16 in parallel to the outside wall 1 of the vehicle body. This embodiment already offers a good protection against rain merely with the swing lid 2.

The characteristics of the first embodiment of the invention can easily be applied to the conditions of a swing lid (not shown) which can be swung about a vertical axis of rotation in parallel to the outside wall 1 of the vehicle body. Such a swing lid is used for filler neck compartment lids. In such an embodiment, a handle which projects downward or a charge cable for the charge plug would lead out through a corresponding recess in the two spray guard surfaces which would then be on the bottom. The control element would preferably be arranged above the charge socket so that the locking bar would engage in an upper holder on the swing lid so that the holder does not interfere with the charge plug. In this type of swing lid, the spray guard surfaces are particularly important because the opened swing lid alone offers little protection against rain.

The general idea of the invention that the locking device secures the charge plug with respect to a removal by a swing lid can be applied to arbitrary embodiments of a swing lid which can be moved from a closed position into an open position. Additional conceivable embodiments, which the term "swing lid" also comprises, relate to translationally displaceable lids or lids which can be swung about an axis of rotation perpendicularly to the outside wall of the vehicle body.

Should the charge socket be constructed for receiving differently configured charge plugs, several holding openings may be provided in order to provide a locking in the secured position also for different types of charge plugs. Thus, as described in above-mentioned U.S. Pat. No. 5,478, 249, for example, for the above-mentioned small or large charge plugs, one correspondingly constructed holding opening respectively can be provided.

Figure 3:
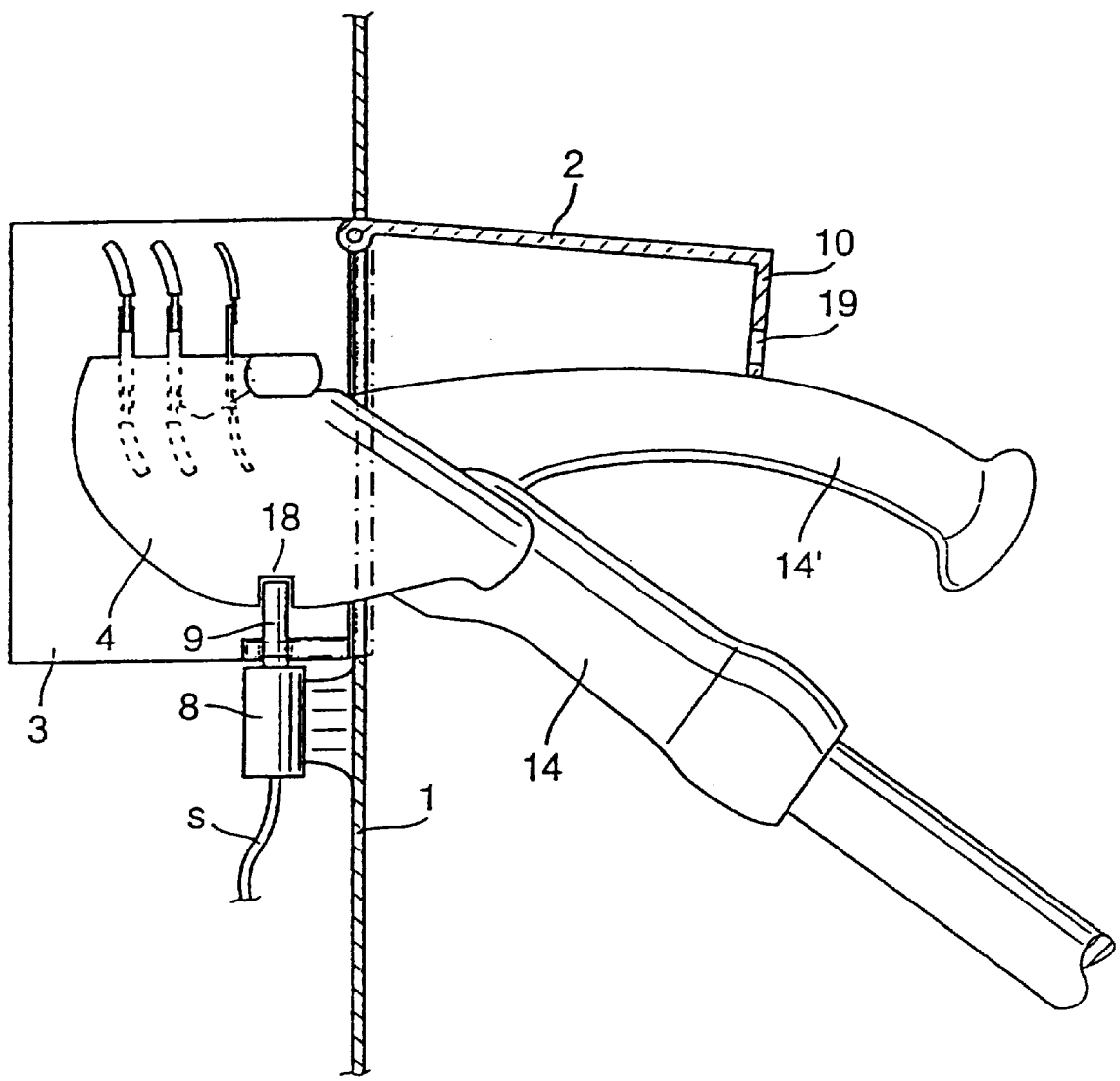
FIG. 3 is a cross-sectional view of a second embodiment of the locking device according to the present invention, in which a charge plug inserted into a charge socket is locked directly.

FIG. 3 is a cross-sectional view of a second embodiment of the locking device according to the present invention, in which case the same reference numbers are retained for identical parts. In this embodiment, a charge plug 4 inserted into a charge socket 3 is locked directly by the locking device in that the locking bar 9 of the control element 8 engages in a corresponding holding opening 18 on the charge plug 4. In an advantageous further development, the swing lid 2 can, in addition, be locked in the closed position by the locking device, as illustrated by a dashed line in FIG. 3. In order to permit, in the closed position of the swing lid 2, engagement of the locking bar 9 in the holder 10 on the swing lid 2, a correspondingly arranged holding opening 19 is provided.

A locking device according to the second embodiment permits the securing also of those charge plugs against a removal which, because of their geometrical dimensions, cannot be secured by the swing lid. This applies, for example, to a charge plug having a second handle 14' for a two-handed guiding, as illustrated in FIG. 3. The control element 8 is arranged outside the charge socket 3. As a alternative, the present invention contemplates arranging the control element inside the charge socket with the advantage of reducing the number of components.

In the embodiments, the locking device can be brought into the locking position by outside power via a switching signal. As an alternative, a manual locking device utilizing keys is also conceivable. However, a locking device operated by external power offers several advantages. The locking device can, for example, be coupled to a central locking system of the vehicle in that the switching signal S is given by the locking system. This makes it possible, after the insertion of the charge plug into the charge socket, to lock the vehicle, for example, by actuating a remote control of the vehicle locking system and to simultaneously secure the charge plug with respect to a removal.

In addition, the switching signal S can be given by a charge current sensing system if a charge current is measured. Furthermore, the switching signal S can be given by a switch integrated in the charge socket when this switch is operated by a charge plug inserted to the end position.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A locking device for protecting a charge socket on a vehicle having a traction battery, comprising a charge plug for charging the traction battery, the charge plug being connectable with a current source by way of a charge cable, and being insertable into the charge socket which is arranged on an outside wall of a vehicle body and being coverable by a swing lid which, in a closed position thereof, is flush with a surface of a surrounding vehicle-body-fixed wall part so as to cover the area defined by the charge socket at the outside wall and lockable in the closed position by the locking device, wherein the locking device is configured to permit the swing lid to be locked in a secured position corresponding to a certain open position in which the swing lid exercises a locking effect with respect to a removal of an inserted charge plug.

2. The locking device according to claim 1, wherein a locking bar engages in a holder arranged on the swing lid for locking of the swing lid.

3. The locking device according to claim 2, wherein the holder is formed by a lug which protrudes on an interior side of the swing lid and has corresponding holding openings arranged corresponding to positions of the swing lid to be secured and into which the locking bar engages.

4. The locking device according to claim 3, wherein the locking device is configured and arranged to be brought into a locking position with outside-power-operation via a switching signal.

5. The locking device according to claim 4, wherein the locking device has a control element arranged to be triggered by the switching signal for reversible lifting of a locking bar disposed adjacent the charge socket, and is displaceable parallel to a wall part fixed to the vehicle body.

6. A locking device for protecting a charge socket on a vehicle having a traction battery, comprising a charge plug for charging the traction battery being connectable with a current source by way of a charge cable, and being insertable into the charge socket which is arranged on an outside wall of a vehicle body and being coverable by a swing lid which, in a closed position thereof, is flush with a surface of a surrounding vehicle-body-fixed wall part so as to cover the area defined by the charge socket at the outside wall and lockable in the closed position by the locking device, the locking device being movable into a locking position with external-power-operation via a switching signal into a locking position and having a control element triggerable by the switching signal for reversible lifting of a locking bar adjacent the charge socket and displaceable parallel to the wall part, wherein, the locking device locks the charge plug, when inserted into the charge socket, against removal by the locking bar being arranged to engage in a holding opening on the charge plug.

7. The locking device according to claim 4, wherein the switching signal is arranged to be issued by a central vehicle locking system.

8. The locking device according to claim 6, wherein the switching signal is arranged to be issued by a central vehicle locking system.

9. The locking device according to claim 4, wherein the switching signal is arranged to be issued by a charge current sensing device.

10. The locking device according to claim 6, wherein the switching signal is arranged to be issued by a charge current sensing device.

11. The locking device according to claim 4, wherein the switching signal is arranged to be issued by a switch integrated in the charge socket.

12. The locking device according to claim 6, wherein the switching signal is arranged to be issued by a switch integrated in the charge socket.

13. The locking device according to claim 1, wherein the swing lid has spray guard surfaces perpendicular to an outside surface so that an inserted charge plug is substantially protected against spraying water or rain.

14. The locking device according to claim 6, wherein the swing lid has spray guard surfaces perpendicular to an outside surface so that an inserted charge plug is substantially protected against spraying water or rain.

* * * * *